United States Patent Office 3,427,816
Patented Feb. 18, 1969

3,427,816
PROCESS AND APPARATUS FOR MAKING GRANULATED FROZEN PARTICLES
Jost Hänny, Winterthur, and Hans Günther Hirschberg, Effretikon, Zurich, Switzerland, assignors to Sulzer Brothers Limited, Winterthur, Switzerland, a corporation of Switzerland
Filed Jan. 10, 1967, Ser. No. 608,386
Claims priority, application Switzerland, Jan. 11, 1966, 353/66
U.S. Cl. 62—74      19 Claims
Int. Cl. A23l 3/36; F25c 1/00

ABSTRACT OF THE DISCLOSURE

A process for making granulated frozen particles by spraying or atomizing a liquid capable of being formed into drops into a cooling gas stream. The frozen particles are maintained out of contact with each other while in the gas stream to avoid adhesion of the particles during the freezing process. A nozzle sprays the liquid into a flowing cooling gas stream and a separator separates the frozen particles from the gas stream for recirculation of the gas and collection of the frozen particles.

---

The invention relates to a process and apparatus for making granulated frozen particles. More particularly, the invention relates to a process and apparatus for making granulated frozen particles from liquids capable of forming crystals.

Processes for the refrigeration and freezing of liquids have been known to rely on solid cooled walls for the removal of heat from the liquids. However, in such processes, an extraordinary tough adhesion has been produced between the particles to be frozen and the solid surfaces of the walls particularly in the case of water-ice which has generally required thawing or mechanical breaking techniques to break the adhesion. Thus, energy losses have been prevalent. In addition, when thawing has been used, some of the generally desirable subcooling of the ice has been lost.

Still other processes have relied on vacuum procedures to manufacture ice by freezing of a liquid under vacuum pressure to remove heat through evaporation. However, since the frozen material produced in this manner has had a temperature of 0° C. or slightly below, the ice particles have rapidly adhered to one another upon formation and have thus complicated the storing of the frozen material.

Briefly, this invention is concerned with the production of finely divided or powdered frozen material, that is, very finely granulated ice made from liquids capable of forming crystals and in particular water and aqueous solutions, such as, for instance, fruit juices, milk, coffee and the like, wherein the material to be frozen can be subjected to substantial subcooling.

The process according to the invention consists in that the liquid to be frozen is atomized into a cold gas current and, in this process, the drops of liquid freeze by giving off heat to the cold gas current without coming in contact with a solid surface. Subsequently, the finely divided frozen material is separated from the gas current in order to be stored or used.

The apparatus of the invention includes at least one refrigerating chamber for freezing a liquid provided with at least one atomizer unit for directing the liquid to be frozen into the chamber, a feed assembly for feeding a gas current into the refrigerating chamber, at least one device for the cooling of the gas current prior to its introduction into the refrigerating chamber, at least one separator for separating the mixture of powdered frozen material and gas, and at least one output device for the delivery of frozen material from the apparatus.

According to the invention, heat from the liquid to be frozen is removed substantially by convection processes. In order to improve the heat transfer to the cold gas current from the liquid, the gas current is passed through the plant preferably under increased pressure. It is furthermore advantageous to have the gas current circulate in the plant in a closed circuit system by means of at least one circulating blower, so that one device provides for the adjustment and maintenance of the operating pressure in the apparatus. Upon use of an increased gas pressure, the volume of the apparatus can, accordingly, be kept relatively small.

According to the invention, it is in principle, possible to produce powdered frozen material from all liquids capable of forming drops or crystals by using a gaseous medium as a carrier gas that has a lower condensation temperature than the freezing point of the liquid to be frozen and, in addition, does not chemically react with the latter.

As a result of the rapid freezing process and due to the fine atomization of the liquid in the cold gas current, for instance air, separating cycles in the freezing of solutions are also eliminated.

In an improved embodiment of the invention, the finely divided frozen material is additionally subcooled prior to its separation from the gas current, for instance by a heat exchange with a cooling agent. In the related apparatus a cooler is provided between the refrigerating chamber and the separator, for instance a cyclone. The finely divided frozen material passes together with the cold gas current through at least one duct of this cooler and, in the process, cleans the exchange surfaces of any hoarfrost likely to have been deposited while being subcooled.

In a further embodiment of the process according to the invention, the atomized liquid is frozen out in a refrigerating chamber in a gas current traveling substantially upward from the bottom. The speed of the gas current is lowered during the freezing-out and increased during the blowing out from the refrigerating chamber and the separating of the mixture. In the process, the rate of flow of the gas current during the freezing-out period is preferably reduced to such a point that the drops of liquid are brought into contact with the cold gas in a vortex bed for a sufficiently long period of time.

For the purpose of adjustment and maintenance of the preferably increased operating pressure, a booster compressor can be provided to recover the gas losses occurring during operation. Alternatively, a replenishing gas can be supplied under increased pressure to the apparatus via the atomizing device for the liquid. In that connection, one embodiment of the invention feeds the replenishing gas in excess under increased pressure into the apparatus via the atomization device and stress-relieves the excess pressure gas in a pressure gas motor which drives the circulating blower. The excess pressure gas subsequently flows through a heat exchanger arranged in the path of the gas current between the circulating blower and the refrigerating chamber counter-currently to the flow of gas current to the refrigerating chamber to absorb heat substantially up to ambient temperature while cooling the replenishing gas current flowing to the refrigerating chamber.

Accordingly, it is an object of the invention to provide a process and apparatus for the freezing of liquids into granular particles while maintaining a suspension of the particles in a freezing medium.

It is another object of the invention to provide a process and apparatus for freezing of liquids in a continuously moving gaseous medium.

It is another object of the invention to maintain frozen particles out of mutual contact during freezing of a liquid.

It is another object of the invention to provide a process and apparatus for the continuous freezing of a liquid into granular particles while maintaining the frozen granular particles in suspension.

It is another object of the invention to provide a process and apparatus for atomizing a liquid into a freezing medium while maintainnig the frozen particles in suspension in the freezing medium.

These and other objects and advantages of the invention will become more apparent from the following detailed description and appended claims taken in conjunction with the accompanying drawings in which:

FIG. 3 schematically illustrates another modification of the invention having a plurality of refrigerating units in series;

Figure 1:
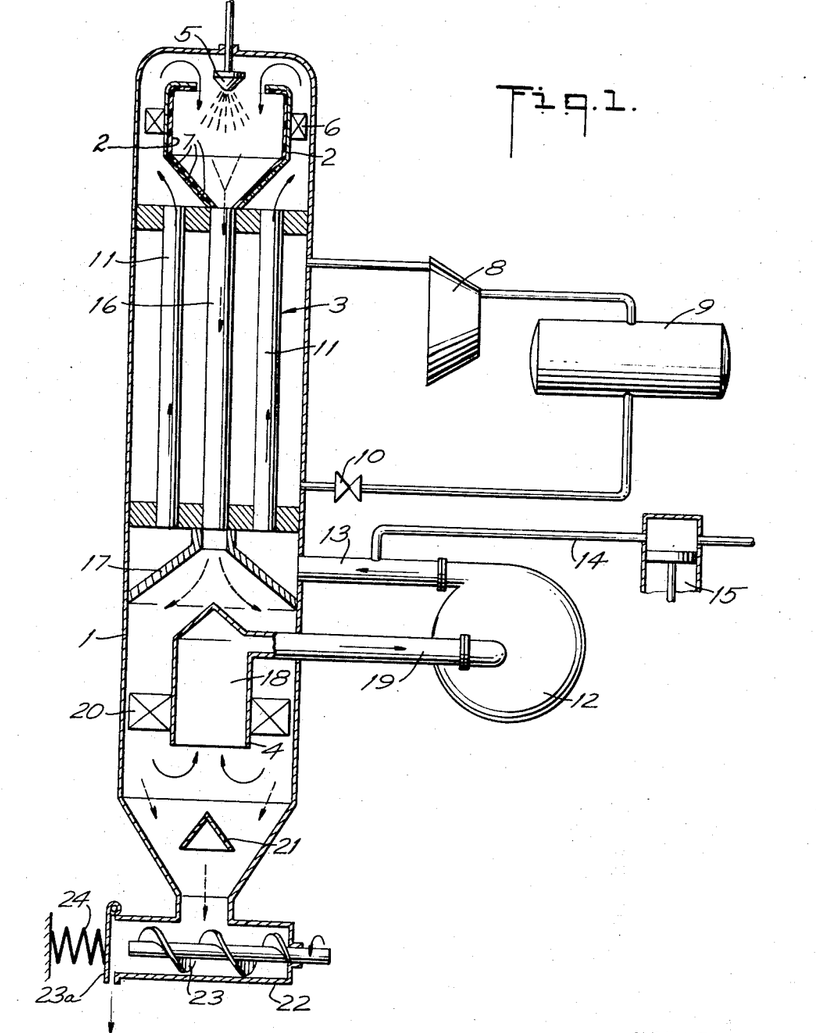
FIG. 1 illustrates an apparatus of the invention for the production of finely divided frozen particles.

Referring to FIG. 1, casing 1 houses a refrigerating chamber 2, a cooler 3, and a cyclone separator 4 in vertically superimposed relation to provide a compact assembly. The refrigerating chamber 2 has an atomization device consisting of a nozzle 5 in the apertured upper end for the introduction of an atomized liquid into the chamber 2. Alternatively, any other type of atomization device can be used, e.g., a rotating spinning disc or the like. In addition, the refrigerating chamber 2 is spaced from the interior casing walls by a series of spaced guide vanes 6 which are secured thereto in a manner to generate a torsional or spiral movement in a cold gas current passing between the vanes. The lower section of the refrigerating chamber 2 are lined with a plastic lining 2' to provided with apertures 7 for introducing cold gas into the refrigerating chamber 2. The inner walls of refrigerating chamber 2 are lined with a plastic lining 21 to prevent as much as possible adhesion to the walls of the ice particles which strike the walls.

The cooler 3 forms the evaporator of the apparatus and is provided with a compressor 8, a condensor 9 and a relief valve 10 as is conventional. The coolant which is circulated through the cooler is, for example, ammonia or Freon; however, other coolants such as cooling brines can be used to dissipate heat from the cooler 3. Also, if the freezing point of the liquid material is above 0° C., water-cooling can also be used. The cooler 3 includes a plurality of ducts 11 which are connected to the delivery side of a circulating bloker 12 via a duct 13. A pressure line 14 of a booster compressor 15 is interconnected to the duct 13 to replenish gas for cooling to the apparatus.

The separator 4 is connected to the refrigerating chamber 2 by an exchange duct 16 which passes through the cooler 3 in sealed relation thereto. The input ends of ducts 11 are closed off from the output end of duct 16 by a cone-shaped partition 17 which is preferably made of insulating material and lined with insulating material. The separator 4 which is designed as a cyclone separator of known design is also provided with a plastic liner similar to the refrigerating chamber 2 to avoid adhesion of frozen particles.

A riser 18 is positioned in the separator 4 chamber and is connected via a line 19 with the circulating blower 12. A vane ring 20 is provided around the riser 18 and a "cyclone obturator head" 21 is positioned below the riser 18.

The lower part of separator 4 is annexed to an output device for refrigerated material which substantially consists of a chamber 22 with a worm gear 23. In addition, a wall of the chamber 22 is formed as a flap 23a biased by a spring 24 toward the worm gear 23. When the pressure of the refrigerating material accumulated in the chamber exceeds the spring pressure, due to the frozen material being conveyed by the worm gear, the flap opens and the frozen material is discharged from the plant. Alternatively, other output devices, such as a bucket wheel or individual pressure containers which are filled in batches, can be used. Also, in specialized instances, briquettes of frozen material can be formed.

In operation, for instance air or nitrogen, is fed into the casing 1 under pressure, for instance 20 atm., via the booster compressor 15. In view of the fact that gas losses do occur upon discharge of frozen material from the casing, pressure is maintained during operation by means of the compressor. The gas flow, the amount of which depends on its inlet temperature into the refrigerating chamber, the amount of liquid supplied, and the desired temperature of the frozen material in the refrigerating chamber, is cooled in the cooler 3 by a heat exchange with an evaporating coolant to a temperature below freezing point of the liquid to be frozen, for instance to about −15° C. in the case of water. Following passage upwardly through ducts 11 where the gas is cooled and the guide vanes 6 which exert an angular moment on the gas current, the cooled gas enters the refrigerating chamber 2. Liquid is then atomized by means of the nozzle 5 into the cold gas current and, in this process, the drops or crystals of liquid freeze by giving off heat to the gas. The refrigerating chamber diameter is dimensioned sufficiently large so that the trajectory of the drops resulting from the dimension and the direction of the movement of the drops upon issuance from the atomizer nozzle and from the effect of the gas current will not permit contact of a drop with the wall at any point before the drop has been frozen. The gas entering through apertures 7 into the refrigerating chambers prevents any depositing of ice particles on the wall.

The mixture of frozen material and gas traverses the duct 16 in the cooler 3 and cleans the exchanger surfaces of any hoarfrost likely to have been deposited while experiencing itself a subcooling. The mixture is preferably subcooled to such an extent that the gas passing through the duct 11 of the cooler needs to be deprived only of the heat it has taken on in the circulating blower 12. The gas is then separated from the frozen material in the separator 4 and conducted via the riser 18 to the circulating blower 12 through the line 19, while the frozen material is discharged via the chamber 22 of the output device. The powdered ice manufacturing apparatus may be combined, for instance, with a freezing and drying plant in which in a known manner the water content is sublimated out of the frozen material in a vacuum chamber.

Figure 2:
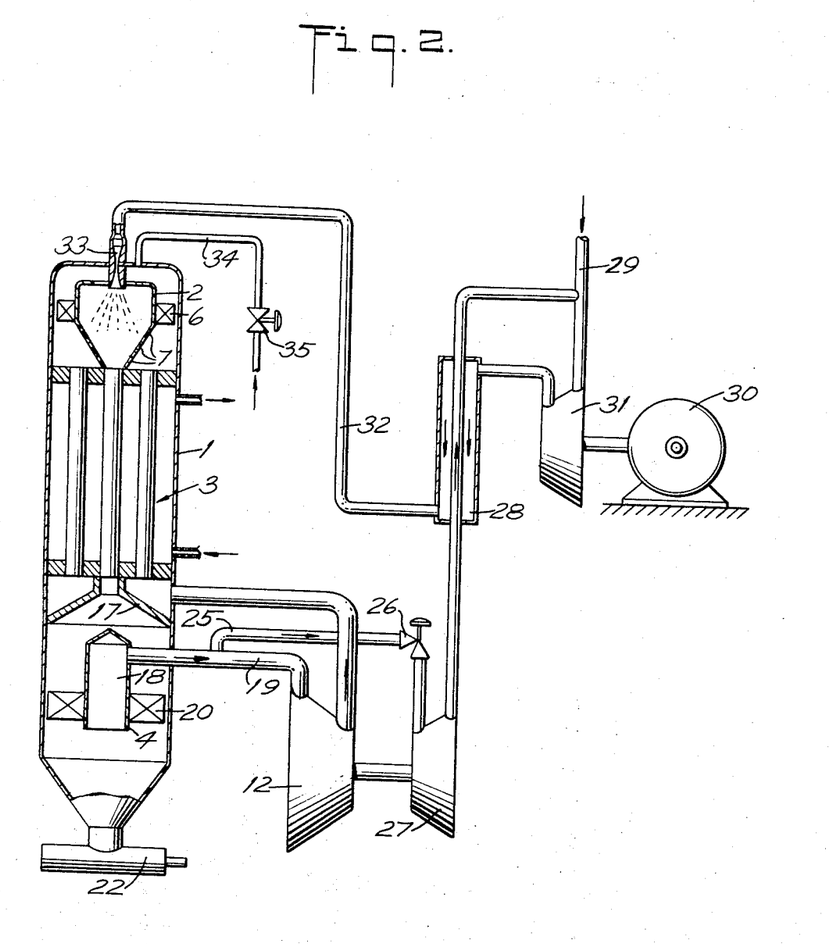
FIG. 2 illustrates a modification of the apparatus of the invention for replenishing gas via the atomizing device.

Referring to FIG. 2, wherein the elements designating corresponding parts in FIG. 1 are provided with identical reference numbers, a modified apparatus of the structure of FIG. 1 can likewise be operated under elevated pressure to replenish gas in excess under elevated pressure into the refrigerating chamber via the atomizer device for the liquid. To this end, a line 25 connected to feedline 19 shunts an amount of gas which is adjustable by a control valve 26 in the line 25 out of the gas circuit and into a pressure gas motor 27 for relief. This pressure gas motor drives a circulating blower 12 and thereby eliminates the need for an electric motor to drive it.

The gas expanded in the motor 27 is heated in a heat exchanger 28 to approximately ambient temperature and is then, together with a replenisher gas supplied via the line 29 as indicated by the arrow, compressed to the operating pressure of the apparatus in a booster compressor 31 which is driven by an electric motor 30. The compressed gas is then cooled in the heat exchanger 28 by heat exchange with the expanded gas current from the gas motor 27 and flows in a line 32 into a nozzle 33 with an ejector effect on the liquid supplied via line 34. In order to adjust the amount of liquid, a dosing device, for instance a dosing pump or a control valve 35 is interpolated in the line 34 for the liquid.

Referring to FIG. 3, three stages of refrigerating units are series-connected in a plant. In these stages the cold gas passes through vane rings 41b, 41c and 41d arranged on the upper part of the refrigerating chambers 40b, 40c and 40d in a manner to impart an angular moment to the cold gas, and into the refrigerating chambers with the liquid which is atomized by means of nozzles 42b, 42c and 42d. Following subcooling of the mixture of gas anl liquid in each of the coolers 43b, 43c and 43d, a separation of the solid and gaseous phases occurs in each of the series-connected separators 44b, 44c and 44d (not shown). In addition, output devices 45b and 45c are provided for the removal of the frozen material.

The separators in this arrangement may also be designed in such a way that only a separation of coarse ice particles out of the mixture entering the subsequent stage occurs.

The last stage may have the separator (not shown) designed, for instance, like those illustrated in FIGS. 1 and 2.

Figure 4:
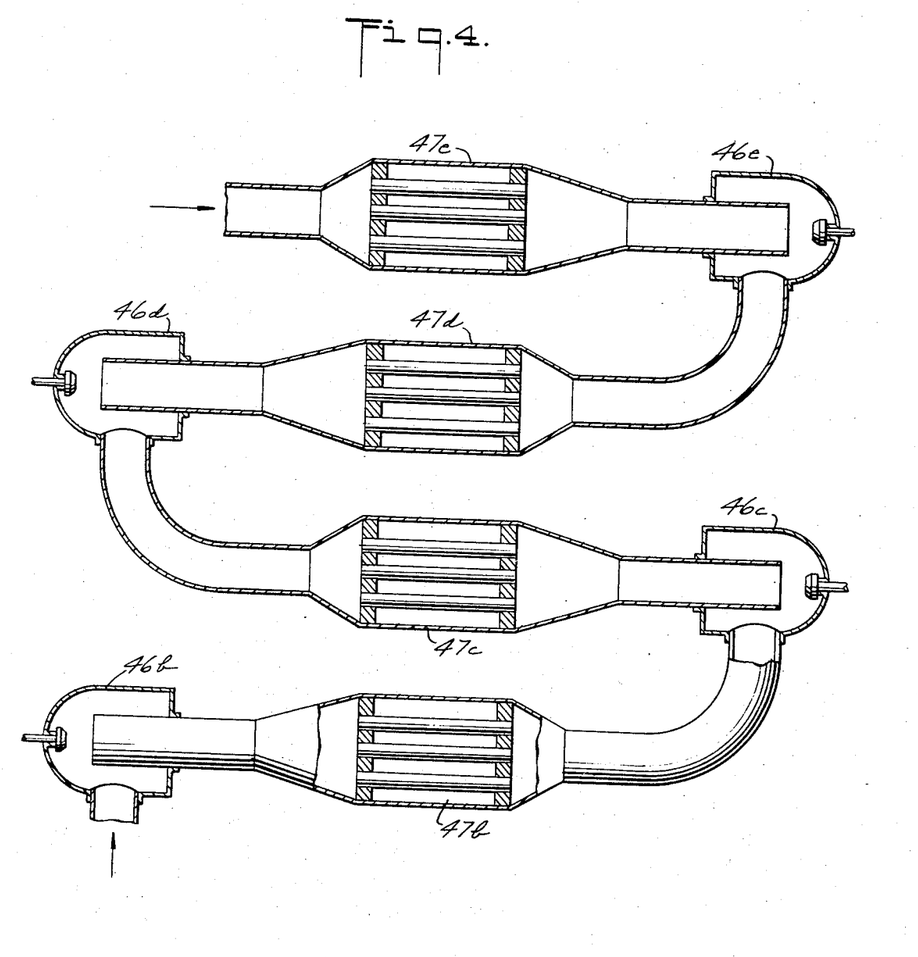
FIG. 4 schematically illustrates a modification of the invention having a plurality of refrigerating units in series with one output.

Referring to FIG. 4, four stages of freezing devices consisting of refrigerating chambers 46b, 46c, 46d and 46e and coolers 47b, 47c, 47d and 47e are arranged in series. In this arrangement, only the last freezing device in the series is provided with a separator and an output device (not shown).

Figure 5:
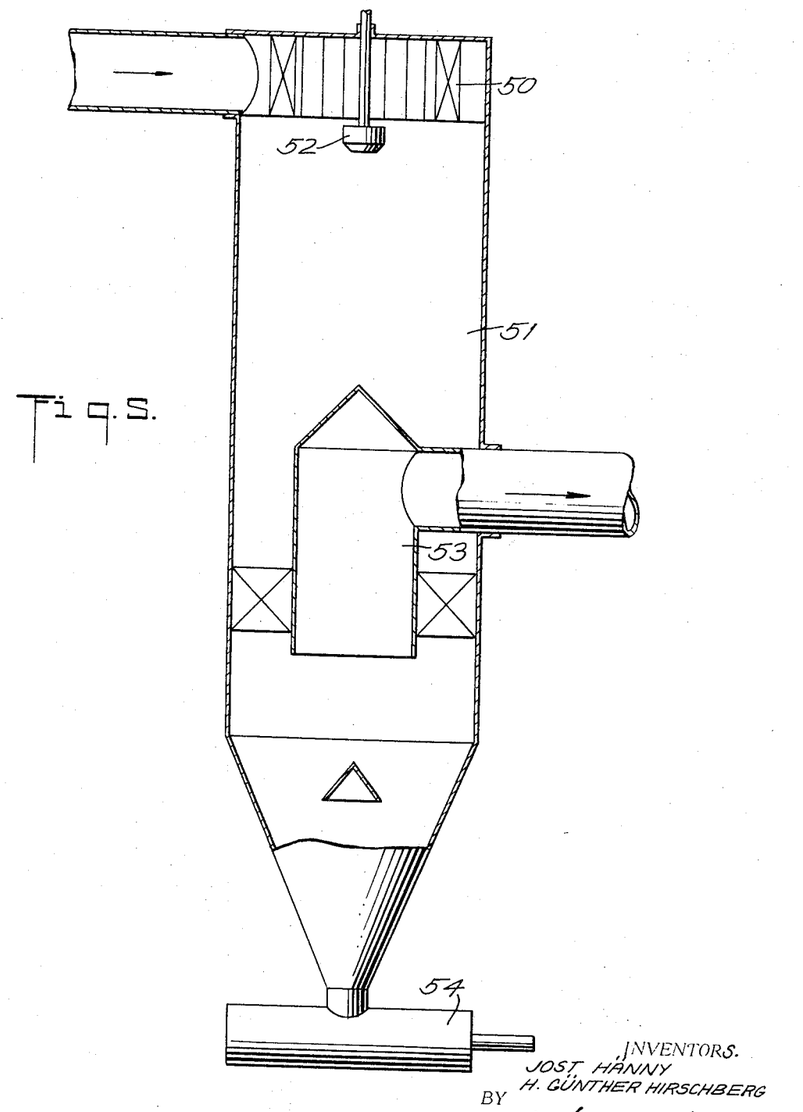
FIG. 5 illustrates a detail view of a compact design freezing chamber and separator.

Referring to FIG. 5, a freezing apparatus includes a vane ring 50, a refrigerating chamber 51 with a spray diffuser 52 for the liquid to be frozen and a cyclone separator 53 arranged in a single casing. The lower end of the apparatus is provided with an output device 54 for the discharge of the frozen material. In this embodiment the desired subcooling of the frozen material is achieved exclusively by heat exchange with the current of carrier gas flowing through the apparatus as indicated by the arrows. Alternatively, the carrier gas can travel in a circuit by means of a circulating blower according to the example illustrated in FIG. 1 and in that case, be cooled by means of a heat exchanger arranged between the blower and the refrigerating chamber.

Figure 6:
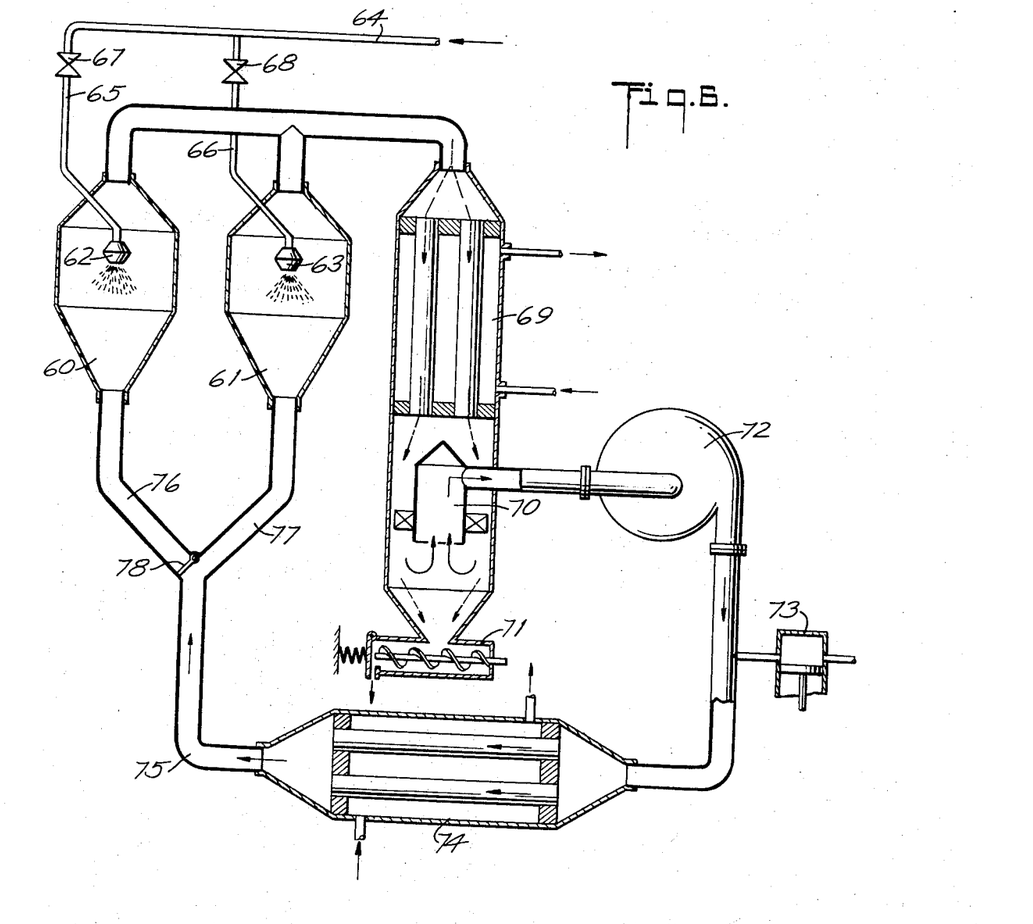
FIG. 6 illustrates a parallel arrangement of a plurality of freezing chambers in one installation.
Figure 8:
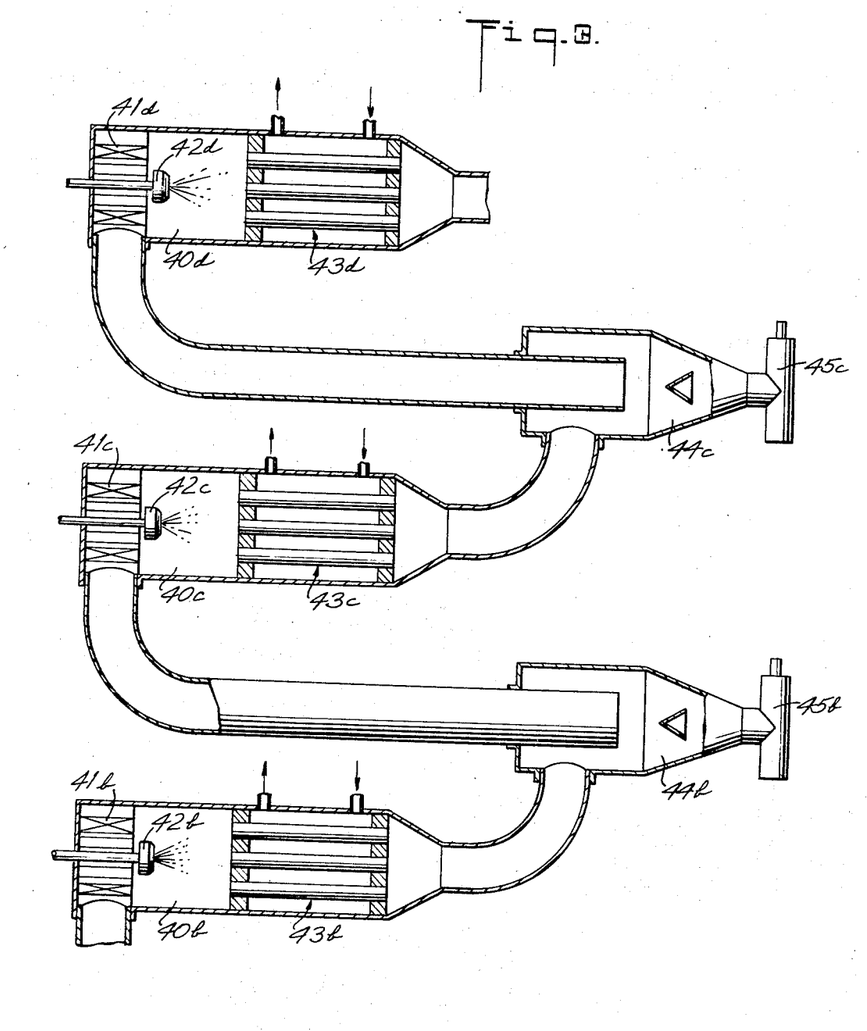

Referring to FIG. 6, a freezing apparatus is provided with two parallel-connected refrigerating chambers 60 and 61. Each one of these chambers is provided with a spray diffuser 62, 63 which is supplied with liquid via lines 65, 66 connected to a feed line 64. Control valves 67, 68 are arranged in the lines 65, 66 to control the flow of liquid into the chambers 60, 61. In other respects, the installation essentially consists of a cooler 69, a separator 70, an output device 71, a circulating blower 72, and a booster compressor 73. These elements of the apparatus have already been described by means of FIG. 1. In addition, a cooler 74 is arranged at the delivery side of the circulating blower in order to remove at least the heat absorbed in the blower. In the case of sufficiently heavy subcooling in the cooler 69 and slight heating of the gas in the circulating blower, the cooler 74 could possibly be omitted. A line 75 coming from the cooler branches off into two feed lines 76 and 77 for each respective refrigerating chamber 60 and 61 and a controllable member 78 is provided at the branch point. Based on this design it is possible to have the cold gas pass with alternating speed through the refrigerating chambers. The figure illustrates the refrigerating chamber 60 during one phase of the process in which liquid is injected into the chamber and cold gas enters at a reduced rate. In this process, the rate of flow of the gas is preferably reduced to such a point that the drops of liquid will float in the gas and permit a vortex bed to form in the chamber. Meanwhile, the refrigerating chamber 61 is traversed by gas at unabated speed and the frozen material produced in the preceding phase is blown out of the chamber, subcooled in the cooler 69 and separated from the gas in the separator 70. In this embodiment of the invention, it is naturally possible to connect a greater number of refrigerating chambers in parallel in which frozen material is periodically manufactured and discharged under pressure. In that connection, the control of the gas current is carried out preferably in such a way that one refrigerating chamber is being discharged under pressure while liquid is being frozen out in the other.

Having thus described the invention it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An apparatus for making granulated frozen particles comprising:
   at least one refrigerating chamber,
   at least one atomizing means in said refrigeration chamber for directing an atomized stream of liquid into said refrigerating chamber,
   at least one feed means for directing a stream of gas into said refrigerating chamber to freeze the atomized liquid therein to granulated frozen particles,
   at least one cooler connected downstream of said refrigerating chamber for subcooling of the granulated frozen particles and said stream of gas upon passage of the granulated frozen particles and gas therethrough,
   at least one separator downstream of said refrigerating chamber and cooler for separating the granulated frozen particles from said stream of gas, and
   at least one output device downstream of said separator for delivery of the separated granulated frozen particles out of the apparatus.

2. An apparatus as set forth in claim 1 further comprising a circulation system having at least one circulating blower therein connected between said separator and said means for directing a stream of cooled gas for circulating said stream of cooled gas therebetween.

3. An apparatus as set forth in claim 2 which further comprises a booster compressor interposed in said circulation system for maintaining an elevated pressure in the apparatus.

4. An apparatus as set forth in claim 2 which further comprises:
   a pressure gas motor connected to said circulating blower for driving said circulating blower,
   a line connected with said circulation system between said separator and said circulating blower for shunting an excess of gas therefrom to said pressure gas motor to drive said pressure gas motor,
   a heat exchanger downstream of said pressure gas motor,
   a booster compressor downstream of said heat exchanger,
   a line for directing replenished gas into said booster compressor,
   means for directing the excess gas from said pressure gas motor through said heat exchanger into said booster compressor to mix with the replenished gas, and
   means for directing the mixed excess and replenished gas through said heat exchanger counter-currently to the flow of excess gas therein to be cooled thereby and subsequently to said atomizing device under elevated pressure.

5. An apparatus as set forth in claim 1 further comprising means for maintaining a predetermined operating pressure in the apparatus.

6. An apparatus as set forth in claim 5 wherein said means for maintaining a predetermined operating pressure is interposed in said means for directing a stream of gas into said refrigerating chamber.

7. An apparatus as set forth in claim 1 wherein a means for directing a stream of replenished gas into said refrigerating chamber is interposed in said atomizing means whereby said stream of replenished gas and the liquid are simultaneously directed into said refrigerating chamber through said atomizing device under elevated pressure.

8. An apparatus as set forth in claim 1 wherein said refrigerating chamber, said cooler and said separator are arranged in a single casing.

9. An apparatus as set forth in claim 1 wherein said atomizing means includes a spray diffusor.

10. An apparatus as set forth in claim 1 wherein said refrigerating chamber has a plurality of apertures in the bottom thereof for admission of a part of said stream of gas and an aperture in the top thereof for admission of the remainder of said stream of gas.

11. An apparatus as set forth in claim 1 wherein said refrigerating chamber and said separator are each lined interiorly with a plastic liner.

12. An apparatus as set forth in claim 11 wherein said separator is a cyclone separator.

13. An apparatus as set forth in claim 1 wherein a plurality of refrigerating chambers each having an atomizing means therein are arranged in series and a plurality of coolers for cooling the gas stream are arranged in series in alternation with said refrigerating chambers.

14. An apparatus as set forth in claim 13 wherein a plurality of separators are arranged downstream of a respective refrigerating chamber in alternation with said refrigerating chambers.

15. An apparatus as set forth in claim 1 wherein a pair of refrigerating chambers each having an atomizing means therein are arranged in parallel relation between said feed means and said separator; and said feed means includes a pair of feed lines, each feed line communicating with one of said refrigerating chambers from a common branch point, and a controllable throttling means between said feed lines at said branch point for controlling the rate of flow of gas into said refrigerating chambers.

16. An apparatus for making granulated frozen particles comprising:
at least one refrigerating chamber,
atomizing means in said refrigerating chamber for directing at least one atomized stream of liquid into said refrigerating chamber,
feed means for directing at least one stream of gas into said refrigerating chamber to freeze the atomized liquid therein to granulated frozen particles,
at least one cooler for cooling the gas, said cooler having a plurality of ducts therein, one of said ducts being connected to said refrigerating chamber downstream thereof for conducting the granulated frozen particles and gas away from said refrigerating chamber, at least one other of said ducts communicating said feed means with said refrigerating chamber for conducting the stream of gas into said refrigerating chamber and for cooling said stream of gas prior to entry into said refrigerating chamber,
at least one separator downstream of said cooler connected to said one duct for receiving and separating the granulated frozen particles from said stream of gas, and
at least one output device downstream of said separator for delivery of the separated granulated frozen particles out of the apparatus.

17. An apparatus as set forth in claim 1 wherein said cooler is disposed vertically below said refrigerating chamber.

18. An apparatus as set forth in claim 1 wherein said feed means passes through said cooler for cooling said stream of gas prior to entry into said refrigerating chamber.

19. A process for making granulated frozen particles from a liquid capable of forming drops comprising the steps of:
directing a stream of cooled gas in a first path,
atomizing a stream of the liquid into said stream of cooled gas to create a heat transfer between the atomized liquid and cooled gas,
freezing the atomized liquid drops in said stream of cooled gas to granulated frozen particles,
maintaining the granulated frozen particles in suspension in said stream of cooled gas to prevent contact of the frozen particles with each other,
subsequently subcooling the mixture of suspended granulated frozen particles and cooled gas to a temperature below the freezing point of the liquid, and
subsequently separating the granulated frozen particles out of said stream of cooled gas.

References Cited

UNITED STATES PATENTS

| | | | |
|---|---|---|---|
| 1,104,920 | 7/1914 | Osborne | 62—74 |
| 3,019,631 | 2/1962 | Freyberg | 68—178 |
| 3,024,117 | 3/1962 | Barlow | 99—206 |
| 3,188,825 | 6/1965 | Van Olphen | 62—347 X |
| 3,257,815 | 6/1966 | Brocoff et al. | 62—57 |
| 3,290,788 | 12/1966 | Seelandt | 34—5 |
| 3,313,032 | 4/1967 | Malecki | 34—5 |

ROBERT A. O'LEARY, *Primary Examiner.*

W. E. WAYNER, *Assistant Examiner.*

U.S. Cl. X.R.

62—347; 99—197

UNITED STATES PATENT OFFICE
CERTIFICATE OF CORRECTION

Patent No. 3,427,816 February 18, 1969

Jost Hänny et al.

It is certified that error appears in the above identified patent and that said Letters Patent are hereby corrected as shown below:

Column 3, line 11, "maintainnig" should read -- maintaining --; line 45, cancel "are lined with a plastic lining 2'" and insert -- is formed by a taper wall which is --; line 48, "lining 21" should read -- lining 2' --; line 60, "bloker" should read -- blower --. Column 5, line 17, "anl" should read -- an --.

Signed and sealed this 31st day of March 1970.

(SEAL)
Attest:

Edward M. Fletcher, Jr.
Attesting Officer

WILLIAM E. SCHUYLER, JR.
Commissioner of Patents